Sept. 10, 1963  J. A. ROWSE  3,103,438
PRODUCTION OF SAUCES AND PUREES FROM FRUITS AND VEGETABLES
Filed Nov. 13, 1961  3 Sheets-Sheet 1

WATER AND/OR JUICE

HEAT EXCHANGER

Inventor:
James A. Rowse,
by Arthur D. Thomson
Attorney

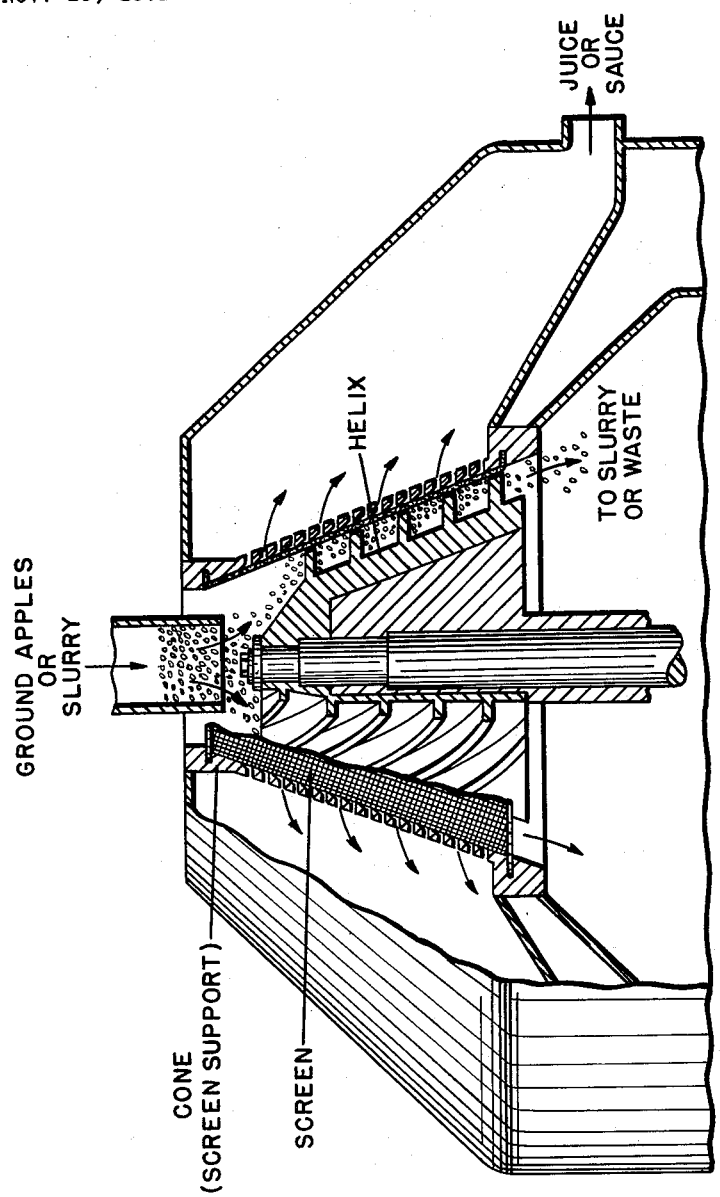

United States Patent Office 3,103,438
Patented Sept. 10, 1963

3,103,438
PRODUCTION OF SAUCES AND PUREES FROM FRUITS AND VEGETABLES
James A. Rowse, Mason, N.H.
(R.F.D., Greenville, N.H.)
Filed Nov. 13, 1961, Ser. No. 151,868
4 Claims. (Cl. 99—100)

This invention relates to methods of commercially producing sauces and purees from crushed or whole fruits and fresh or processed vegetables and pertains more particularly to a continuous method for the production of apple sauce from raw apples by forcibly extracting high grade, commercial sauce (and a predetermined quantity of apple juice, if desired) in a screening centrifuge, or a succession of such centrifuges.

This application is a continuation-in-part of my pending application, Serial No. 41,464, filed May 13, 1960, and to be abandoned; and said pending application is a continuation-in-part of my previous application, Serial No. 855,750, filed November 27, 1959, and now abandoned.

The improved method is herein described in connection with the extraction of apple sauce from crushed raw apples, but it will be understood that the apples may be pre-cooked or otherwise processed, if desired, and that the methods herein disclosed and claimed may be practiced in extracting sauces or purees from other fruits and vegetables of similar meaty consistency.

Heretofore, the customary procedure for producing apple sauce on a commercial scale has involved the selection of choice, hard winter varieties of large-sized apples, which are at least 2½" in diameter and perfectly round in shape; machine peeling and coring the apples, frequently with hand trimming of the meat; chopping the apple meat; cooking the chopped segments with sugar and water; pulping or finishing the cooked apple; and packing the screened sauce in an appropriate container while the same is at a temperature high enough to insure preservation.

It is the principal purpose of the present invention to avoid those separate, costly and time consuming operations, and to provide a relatively simple and efficient process for making a superior grade of apple sauce from any good quality apples, regardless of their size, shape or variety, in a continuous operation. Although the primary objective of the improved method is the production of such apple sauce, a predetermined portion of the juice may also be extracted separately for packaging as apple juice or apple cider, after such further clarification or "polishing" as may be necessary to produce a clear beverage, or for packaging as vinegar after further processing.

The production of apple sauce in accordance with this invention will be explained in connection with the accompanying schematic drawings, in which:

FIG. 5 is a diagrammatic elevation, partly broken away and in section, showing the essential operative elements of a screening centrifuge suitable for use in practicing this invention.

Figure 1:
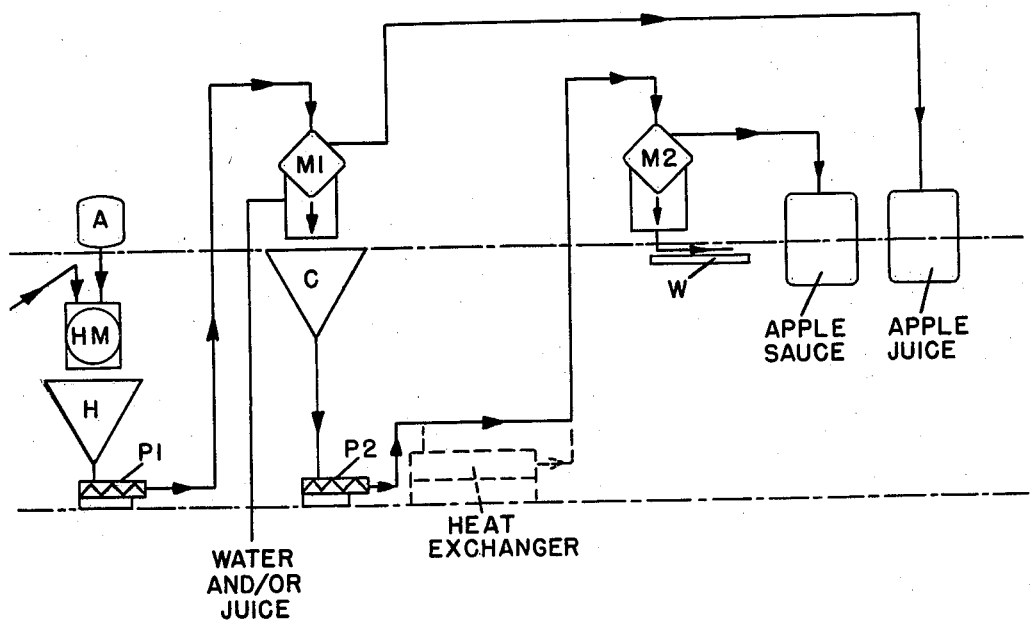
FIG. 1 is a diagram of the sequence of operations in a continuous process involving the use of two screening centrifuges and the extraction of apple juice by the first centrifuge.

The improved method, as herein described in connection with FIG. 1, of the accompanying drawings, involves the steps of crushing raw apples in a standard hammer mill HM, preferably in the presence of a small quantity of a suitable anti-oxidant, such as ascorbic acid, contained in supply tank A, to deter browning of the crushed apples and the juice and sauce extracted therefrom; conveying the crushed apples deposited in hopper H, as by a pump P1, to a first screening centrifuge M1, equipped with a relatively fine screen; extracting a predetermined quantity of apple juice through the fine screen of centrifuge M1, piping the extracted juice to a reservoir labeled Appled Juice, and depositing the residual pulp, including the inedible solid particles, in a conical hopper C from said centrifuge; mixing water, juice or a combination thereof with the deposited pulp, by introducing the same as a slurrying liquid through a pipe labeled Water which may lead to the base of centrifuge M1, or directly to cone C if preferred; slurrying the deposited pulp with said liquid in cone C which is preferably equipped with a suitable agitator (not shown), to insure thorough mixing thereof.

The slurry is then conveyed from cone C, as by pump P2 to a second screening centrifuge M2 having a relatively coarse screen; extracting apple sauce through the coarse screen, piping the extracted sauce to a reservoir labeled Apple Sauce, and depositing and discharging the residual chaff, from centrifuge M2, onto a waste conveyor W. The slurried pulp transferred from cone C to centrifuge M2 is preferably heated and kept hot, to prevent browning of the slurry and the pulp extracted as apple sauce, due to oxidation. The temperature may be maintained at 185° F., or higher if desired, by a recycling or other heater, as labeled Heat Exchanger, by introducing hot water or steam to the base of said centrifuge or to the cone C, or otherwise.

The pumps P1 and P2 are shown as worm type conveyors of standard construction and operation, but other types of pumping apparatus may obviously be employed; and the structural details of other apparatus used in carrying out the process, except the screening centrifuges, are not important to the practice of this invention.

Figure 3:
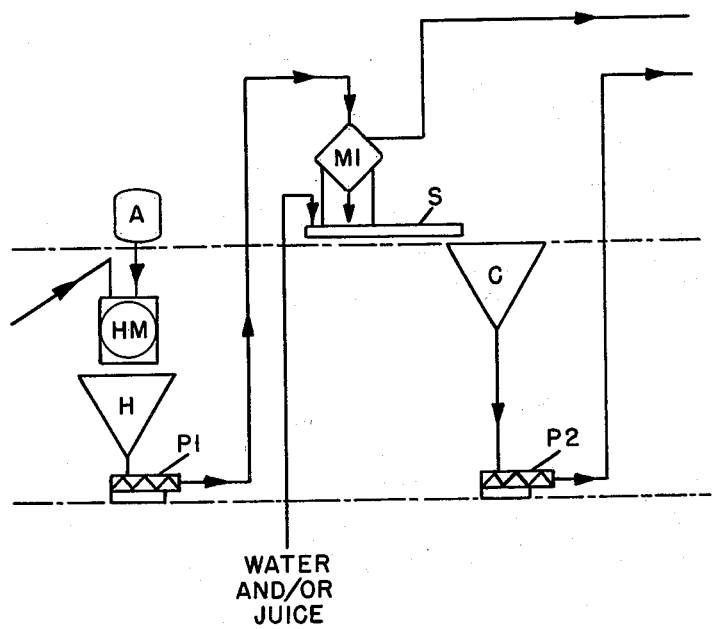
FIG. 3 is a fragmentary diagram similar to FIG. 1, illustrating the optional step of conveying the crushed apple pulp and residue from the first centrifuge, through a mixer-screw conveyor.

For example, in the optional and preferred slurrying step diagrammed in FIG. 3, the residual pulp and solids discharged from centrifuge M1 are deposited in the trough of a standard type of combination mixer-heater and screw conveyor S which discharges the slurry into cone C. Such food mixing screw conveyors have heretofore been used in blanching fruits or vegetables with steam or hot water, and have been sold for that purpose under the trade name "Rietz Thermascrew." When used for the present purpose, heat is applied through the hollow screw of the conveyor, and/or through steam jets, only if heat is desired at that step of the process.

When the screw conveyor S is employed, as in FIG. 3, water, apple juice or a combination of water and juice is preferably added to the juice and solids deposited in the trough of the conveyor, as a slurrying liquid, by piping the liquid to the trough through the pipe line labeled Water and/or Juice. The pulp and solids are then mixed and slurried with the liquid while passing through the screw conveyor S; and heat may be applied, if needed, to prepare the slurry for more efficient extraction at the succeeding centrifuge M2 (FIG. 1), or to further inhibit browning of the pulp or sauce, as aforesaid. The mixer-conveyor S ensures a thorough mixing of the slurried pulp and deposited solids, and deposits the slurry in cone C, whence it is pumped to centrifuge M2 as described in connection with FIG. 1.

I have found that the usual types of pulpers, finishers, or centrifugal extractors heretofore employed in connection with the manufacture of purees or sauces cannot satisfactorily be used for the extraction of the juice, pulp and edible solids from crushed whole fruits or vegetables, or from a slurry thereof. Crushed apples, for example, form a nearly impenetrable mass from which only small quantities of juice, and practically no clear sauces or purees can be separated by mere screening or draining or ordinary centrifuging. In order to extract a high percentage of juice, sauce or puree, it is necessary to move a relatively thin layer of the mass of crushed fruit or slurry over a screen having openings of predetermined size, and to forcibly extract the juice and pulp by centrifugal force through a screen which retains inedible solids as chaff.

Standard basket centrifuges have no means for moving a thin layer of crushed fruit over the surface of a screen, and cannot separate a substantial proportion of the juice or pulp from the impenetrable mass, irrespective of the degree of centrifugal force. The clarifying centrifuges or de-sludgers which involve a multiple-disc arrangement with close tolerances will not work satisfactorily because the large particle sizes of inedible solids in crushed fruit will not pass between the discs.

For the purposes of the present invention it is accordingly necessary to utilize a screening centrifuge which will operate upon whole crushed fruit, including the inedible undesired solids, such as skins, stems, seeds, seed cells and blossom ends, as well as the edible, meaty content of the fruit; and which will separate substantially all of the juice and pulp from the undesired solids so the latter may be discharged as substantially dry chaff.

It is also highly desirable that crushed whole fruit, including such inedible solids, be used in the practice of the improved centrifugal screening process, for the solid particles decrease the compactness of the mass of crushed fruit meat or pulp, and tend to make it more porous and easily movable through the screening centrifuge, whereby practically all of the juicy pulp is extracted as sauce or puree, leaving the dry chaff as aforesaid.

The only type of centrifuge which has proved to be efficient and satisfactory in the commercial practice of my invention is that diagrammatically shown in FIG. 5 of the drawings. Such screening centrifuges have heretofore been used for other purposes, and are manufactured and sold under the trade names "Mercone" and "Conejector." They comprise essentially, as shown, a rotatable, conical drum having helical, peripheral blades, labeled Helix in FIG. 3; a rotatable, conical frame labeled Cone (Screen Support), spaced from the drum and slotted to provide ports or passageways for extracted juice and pulp; and a conical, slotted or perforated plate, labeled Screen, supported by the cone in closely spaced relation to the helical blade or worm of the rotating drum.

Because of the narrow space between the drum of the helix and the screen, only a relatively thin layer of the crushed fruit, fed in a continuous stream through the opening in the top of the centrifuge and rendered porous by the solid particles mentioned above, is carried downwardly over the surface of the screen by the positive action of the helix. The juice or pulp is extracted through the screen by means of the centrifugal force created by the spinning action of the machine and acting upon the crushed fruit between the courses of the helical blades.

Such extraction, the downward movement of the mass and the discharge of waste particles is preferably accomplished by rotating the drum or helix at a slightly faster rate than the speed of rotation of the screen and its supporting cone. The amount of solids in the juice or the particle size of the solids in the purees or sauces extracted depends upon the size of the screen openings.

As explained in connection with the process shown in FIG. 1, involving two centrifugal extraction operations, the screen of the first centrifuge is relatively fine, so that only apple juice is extracted at that stage, and the mass of pulp and solids is discharged and then slurried for a second extraction step in a centrifuge having a relatively coarse screen which passes the balance of the juicy pulp, and discharges substantially dry chaff for waste disposal. Some pulp particles which are slightly larger than the openings in the coarse screen are drawn through the screen by the centrifugal action of the machine, the force of such action increasing progressively as the crushed fruit is moved downwardly over the continuously increasing diameter of the centrifuge.

That two-step extraction procedure is especially valuable in processing relatively soft and juicy fruits or vegetables such as McIntosh apples which have not heretofore been successfully used in making commercial apple sauce, although they have been suitable for the production of very soft and juicy purees for infants' food. The initial juice extraction step is thus desirable to reduce the water content of the mass, prior to the extraction of sauce from soft fruits; and it will be understood that the quantity of the juice so extracted may be regulated, according to the water content of the fruit, by selecting a screen with appropriately sized openings. For example, the volume of the extracted juice may be regulated to correspond, approximately, with the proportion of juice which would be lost by peeling and coring the same apples to produce sauces and purees by old and conventional methods.

It will also be apparent that the consistency of the slurry fed to the second centrifuge may be controlled by adding more or less of the slurrying liquid—either water, juice or a mixture—to the pulp and solid mass in the cone C (FIG. 1) or in the screw conveyor S (FIG. 3); and that the texture of the extracted apple sauce may be further regulated by the type of screen selected for the second centrifuge.

In the commercial practice of the two-step process, the openings of the screen of the first centrifuge are preferably .005" to .010" in width; and the openings in the screen of the second centrifuge may be in the range of .025" to .05" in width. The openings may be round holes or narrow slots, as desired.

Figure 2:
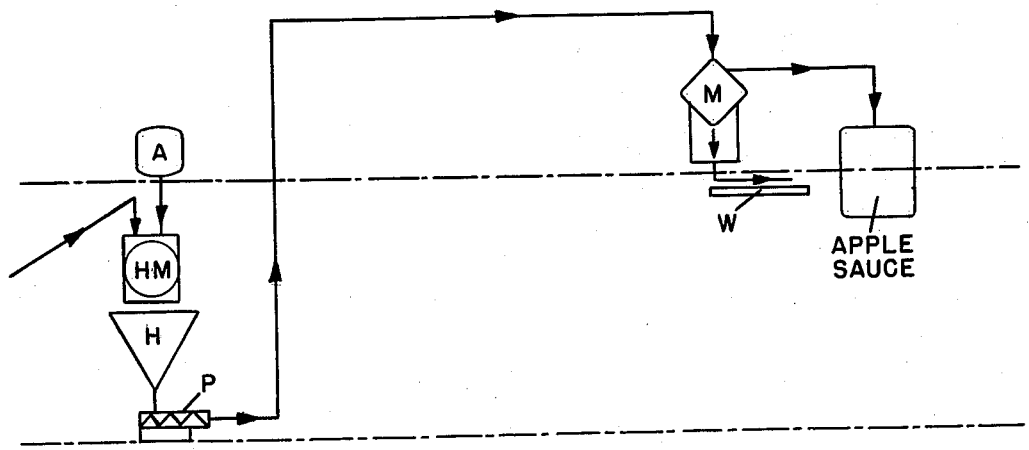
FIG. 2 is a similar diagram involving the direct extraction of apple sauce in a single centrifuge.

The optional process indicated in FIG. 2, involves only one screen-centrifuging step, and is suitable for hard fruits or vegetables, such as relatively dry Winter apples, having low juice content. The crushed, whole apples with antioxidant A, are fed directly to the centrifuge M, and sauce is extracted in the manner above described, without extracting juice as a preliminary step. If the juice content of the crushed apples is insufficient to produce sauce of the desired texture, water and/or juice may be added to the apples while they are being ground in the hammer mill. The screen of centrifuge M may have openings sized between .025" and .05", to permit extraction of substantially all of the meaty pulp of the crushed apples, and retain for discharge the waste chaff and residual pomace.

Figure 4:
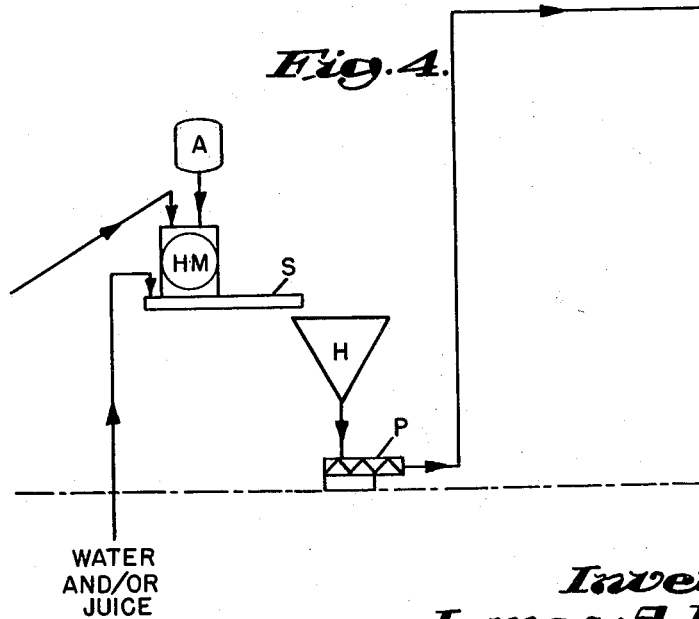
FIG. 4 is a fragmentary diagram similar to FIG. 2, indicating the optional use of the mixer-screw conveyor in the single centrifuge method.

The optional process outlined in FIG. 4, is preferred to the optional process diagrammed in FIG. 2 in that the crushed apples from hammer mill HM are deposited in the trough of a mixer-heater screw conveyor S of the type descibed above, so that the pulp and inedible solids are thoroughly mixed and heated if necessary before the mixture is pumped to the centrifuge M (FIG. 2). In this case, if additional water, juice or a combination thereof is to be added, the liquid is supplied to the trough of the conveyor S through thepipe line labeled Water and/or Juice (FIG. 4). The conveyor deposits the mixture, in the hopper H whence it is transferred by means of pump P to the open top of the centrifuge M for the extraction of sauce and deposit of chaff in the manner described in connection with FIGS. 1 or 2.

It will be appreciated that the effective size of the screen openings, in any of the continuous procedures herein described, will depend upon the character of the fruit and the desired grain or texture of the sauce or puree which is to be extracted. It will also be apparent that more than two screening centrifuges may be used, if desired, for special conditions, in practicing this invention. Any of such processes are carried on as continuous operations, with automatic feeding and removal of the waste, as well as of the commercial products.

Finally, it will be understood that the term "apples," as used in the appended claims is intended to include other fruits and vegetables of comparable meaty consistency; and that the term "sauce" contemplates thin purees as well as thicker sauces.

I claim:

1. A continuous method of producing apple sauce from whole, uncooked apples, comprising the following steps: crushing the whole apples in the presence of an edible antioxidant, helically conveying under centrifugal force a continuous thin layer of the crushed apples, including the edible juicy pulp and the skin, seeds and other inedible solids thereof, through a narrow passageway, and simultaneously centrifugally screening edible, juicy pulp from the inedible solids, to continuously extract the juicy pulp as apple sauce, and continuously discharging the inedible solids from the passageway.

2. A method as described in claim 1, in which the edible juicy pulp of the crushed apples is heated to prevent browning of the pulp and apple sauce due to oxidation.

3. A continuous method of producing apple sauce from relatively soft, whole, uncooked apples, comprising the following steps: crushing the whole apples in the presence of an edible antioxidant, helically conveying under centrifugal force a continuous thin layer of the crushed apples, including the edible juicy pulp and the skin, seeds and other inedible solids thereof, through a narrow, conical passageway, and simultaneously centrifugally screening the juice from the pulp and inedible solids of the layer of crushed apples, to extract apple juice, and continuously discharging the residual pulp and the inedible solids from the passageway; continuously mixing and slurrying the discharged residual pulp and inedible solids to form a slurry, helically conveying under centrifugal force a continuous thin layer of the slurry through a narrow, conical passageway, and simultaneously centrifugally screening the slurried pulp from the inedible solids, to extract juicy pulp as apple sauce, and continuously discharging the inedible solids from the passageway as waste.

4. A method as described in claim 3, in which the edible juicy pulp of the crushed apples is heated to prevent browning of the pulp and apple sauce due to oxidation.

References Cited in the file of this patent

UNITED STATES PATENTS

| | | |
|---|---|---|
| 1,119,263 | Frericks | Dec. 1, 1914 |
| 2,890,961 | Davis | June 16, 1959 |
| 2,935,407 | Haman | May 3, 1960 |